United States Patent [19]

Erickson

[11] Patent Number: 4,563,295

[45] Date of Patent: Jan. 7, 1986

[54] HIGH TEMPERATURE ABSORBENT FOR WATER VAPOR

[76] Inventor: Donald C. Erickson, 1704 S. Harbor La., Annapolis, Md. 21401

[21] Appl. No.: 520,305

[22] Filed: Aug. 4, 1983

Related U.S. Application Data

[63] Continuation-in-part of Ser. No. 428,483, Sep. 29, 1982, Pat. No. 4,454,724.

[51] Int. Cl.[4] .......................... C09K 5/04; F25B 15/06
[52] U.S. Cl. ........................................ 252/69; 252/67; 252/71
[58] Field of Search ............................... 252/67, 69, 71

[56] References Cited

U.S. PATENT DOCUMENTS 4,454,724  6/1984  Erickson ............................... 62/112

FOREIGN PATENT DOCUMENTS 2942697  5/1981  Fed. Rep. of Germany .

OTHER PUBLICATIONS

Russian Journal of Inorganic Chemistry (English Translation), vol. 8, No. 12, Dec. 1963, pp. 1436–1441.
Tripp, "Vapor Pressures of Hydrate Melts Containing Lithium Nitrate and Alkali Nitrites", 1983.
Anon., "Diluted Salt Transfers Heat", Oil and Gas Journal, Jul. 13, 1970, pp. 76, 81.
Kohl et al., *Gas Purification*, 3rd Ed., 1979, Chapter 11.
Babenko, "Aqueous System Composed of Potassium and Sodium Nitrates and Nitrites", Zh. Neorg. Khim., 1972, 17(11), 3059–62, (Chem. Abstracts 78:48648e).

*Primary Examiner*—A. Lionel Clingman
*Assistant Examiner*—Robert A. Wax

[57] ABSTRACT

The invention discloses a novel binary composition of matter for use in absorption cycles and similar applications requiring the reversible absorption and desorption of water vapor. The composition comprises an aqueous solution wherein the nonaqueous component consists essentially of a mixture of alkali metal nitrates optionally admixed with at least one alkali metal nitrite.

11 Claims, No Drawings

HIGH TEMPERATURE ABSORBENT FOR WATER VAPOR

BACKGROUND ART

This application is a continuation-in-part of application Ser. No. 428,483 filed by Donald C. Erickson on Sept. 29, 1982, now U.S. Pat. No. 4,454,724, which is incorporated by reference.

TECHNICAL FIELD

This invention relates to solution compositions which absorb and desorb useful quantities of water vapor at high boiling point elevation, and are useful in abosrption cycle devices such as heat pumps. The solution and the absorption cycles which employ it are particularly advantageous at high temperatures, e.g., up to 260° C. and even higher.

There has long been an identified need for solution compositions useful for absorbing substantial amounts of water vapor at high temperature and at high boiling point elevations, but which can use ordinary materials of construction without causing excessive corrosion. This is especially true in absorption cycle processes or apparatus, such as air conditioners or heat pumps—both high temperature heat powered (forward cycle) and waste heat powered (reverse cycle). Aqueous absorbents in current use such as alkali halides, NaOH, or $H_2SO_4$ become excessively corrosive to ordinary construction materials above about 170° C. This makes it difficult or impossible to achieve the efficiency benefits of two stage generator operation, or to achieve the higher output temperatures appropriate for heat pump applications above ambient temperature.

U.S. Pat. No. 3,478,530 describes a novel aqueous absorbent comprised of LiBr plus $ZnBr_2$. It also describes some of the benefits to absorption cycles of higher temperature operation.

U.S. Pat. No. 4,311,024 describes a novel corrosion inhibitor for addition to aqueous lithium bromide in an absorption cycle. The inhibitor comprises 0.01 to 0.05% by weight of alkali metal nitrate plus 0.005 to 0.1% by weight of triazole compound.

Melting point data on various anhydrous alkali metal nitrate and/or nitrite melts can be found in the *Journal of Physical Chemistry Reference Data* Volume 1, Nov. 3, 1972, pages 581–745 by G. J. Janz, et al. published by the American Chemical Society for the National Bureau of Standards.

Boiling point elevation data for several aqueous alkali metal nitrate-nitrite mixtures can be found in the article "Vapor Pressures of Hydrate Melts Containing Lithium Nitrate and Alkali Nitrites" by T. B. Tripp, of the University of Maine, presented at the 1983 California meeting of the Electrochemical Society and to be published in the proceedings of the Molten Salt Symposium, plus in the references to that paper. One mixture of alkali metal nitrates and nitrites is currently widely used as a heat transfer medium—53 weight percent $KNO_3$, 40 weight percent $NaNO_2$, and 7 weight percent $NaNO_3$. The journal article "Diluted Salt Transfers Heat" appearing in the July 13, 1970 issue of the *Oil and Gas Journal* pages 76–77 describes a technique of lowering the 141° C. melting point of that anhydrous salt by adding water during cooldown, thereby making possible a melting point as low as 10° C. or less. The water is subsequently boiled out of the solution during heatup, and is all gone by the time a temperature of 250° C. is attained.

Salt compositions can be expressed as either weight percent or mole percent (m/o). Also, the compositions can be expressed as either the proportions of the various molecular species or alternatively of the various ionic species necessary to produce the mixture under consideration, with the understanding that charge neutrality is preserved. Also, a given salt composition has properties independent of what type of constituents were combined to achieve that composition. For example, an anhydrous composition consisting of 50 ionic percent $Li^+$, 50 ionic percent $K^+$, 50 ionic percent $NO_3^-$, and 50 ionic percent $NO_2^-$ can be prepared by mixing an equal number of moles of $KNO_3$ with $LiNO_2$, or of $LiNO_3$ with $KNO_2$, or any combination of the two mixtures.

DISCLOSURE OF INVENTION

The invention comprises an aqueous solution for absorbing water vapor wherein the nonaqueous component of the solution consists essentially of a mixture of alkali metal nitrates optionally admixed with alkali metal nitrites. The aqueous component of the solution will normally comprise between 1 and 50 m/o of the solution. The solution is useful as the absorbent in an absorption cycle apparatus of conventional and well known characteristics such as that described in the parent application and the cited prior art references or in a drying apparatus, in addition to other applications for reversibly absorbing and desorbing water vapor. For higher temperature operation above about 260° C., the solution should exclude either lithium cations or nitrite anions.

BEST MODE FOR CARRYING OUT THE INVENTION

It has now been discovered that an aqueous solution containing mixtures of at least two alkali metal nitrates optionally admixed with at least one alkali metal nitrite forms an acceptable absorbent for water vapor in absorption cycles. The alkali metal cations should be selected from lithium, sodium, and potassium due to cost considerations. Within the universe of possible mixtures selected from the three alkali metal cations and the nitrate and nitrite anions, it has been found that certain mixtures yield more advantageous properties depending on the desired use conditions. Where a low anhydrous mixture melting point is desired, a maxiumum of all types of ions should be present, to maximize the entropy of mixing and lower the melting point. The mixture containing 33 cationic percent of each alkali cation and 50 anionic percent of each anion has been found to have a melting point below 78° C. Low melting points are particularly valuable during startup and shutdown operations, when the solution encounters ambient temperatures.

In order to maximize the water carrying capability, the lithium ion content should be maximized. However in order to achieve high water carrying capability at high boiling point elevations and at low temperatures, some additional cation selected from sodium and potassium should also be present, in order to extend the solubility limit, i.e., the point at which solution crystallization occurs.

It has further been discovered that the combined presence of high lithium cation concentration and high nitrite anion concentration in the aqueous absorbent solution can lead to thermal degradation at higher temperatures. Lithium nitrite is the least thermodynamically stable nitrite of the three alkali metal nitrites under consideration. It is hypothesized that water reacts with lithium nitrite at higher temperatures to form more stable lithium hydroxide and release nitrogen oxide gases, although the mechanism of degradation is not known with certainty. In general, the higher the temperature, the lower the combined presence of lithium plus nitrite must be, in order to avoid this undesirable degradation. Either type of ion taken singly can be in the absorbent solution at high temperature, it is only the combined presence that leads to difficulties. In other words, a lithium cation containing mixture is suitable for high temperatures provided no nitrite is present—lithium nitrate alone or in any combination with sodium and/or potassium nitrate would be suitable as an aqueous absorbent at temperatures well above 200° C. In general such mixtures would generally preferably comprise at least 20 m/o lithium nitrate to increase water carrying capability, and at least 20 m/o $KNO_3$ and 10 m/o $NaNO_3$ to decrease melting point and increase solubility limit. Alternatively a high temperature melt could contain nitrite, but little or no lithium cation. Such a melt would be comprised of sodium and potassium nitrite and nitrate. In general such mixtures would preferably comprise at least 10 ionic percent each of sodium cation, potassium cation, nitrate anion, and nitrite anion, to decrease the melting point, and would be usable as aqueous absorbent of water vapor well above 200° C.

The thermal degradation of melts containing both lithium cations and nitrite anions is suppressed by the presence of potassium cations, due to the greater thermodynamic stability of $KNO_2$ and the lower stability of $KOH$. Thus the acceptable use temperature of aqueous melts containing both lithium and nitrite can be increased by the presence of potassium cations. Greater $K^+/Li^+$ ratios allow higher temperatures, and greater $NO_3^-/NO_2^-$ ratios allow higher temperatures. For example, an equimolar mixture of $LiNO_3$ and $KNO_2$ is useful at least up to 180° C., and compositions with more $K^+$ and/or more $NO_3^-$ are useful at even higher temperatures. Thus it will usually not be necessary to adopt the mixtures described above excluding either lithium cation or nitrite anion unless temperatures well above 200° C., and even above 260° C., are required.

From the above it can be seen that almost any combination of alkali metal nitrates optionally mixed with nitrites will be useful as aqueous absorbents of water vapor. Furthermore, the most preferable mixtures have the common characteristic that they are comprised of at least two alkali metal cations plus nitrate anions, and further comprised of at least one of a third type of alkali metal cation or nitrite anions.

The above compositions of matter useful for reversibly absorbing and desorbing water vapor have general utility not limited to use in absorption cycles. For example they can also be used in apparatus for regenerative drying of hot gas. Regeneration can be by either temperature or pressure swing. Prior art water vapor absorbents used in this application include the various ethylene glycols, e.g., triethylene glycol, and also lithium chloride, as described in "Gas Purification" by A. Kohl and F. Riesenfeld, third edition, 1979, Gulf Publishing Co., chapter 11 (Absorption of Water Vapor by Dehydrating Solutions). All the prior art absorbents are limited to temperatures below about 200° C. due to either corrosion or thermal degradation, and hence the high temperature water vapor absorbents described herein make it possible to dry air or other gases at substantially higher temperatures than are possible in the prior art. For regeneration of the absorbent in a temperature swing cycle, a hot gas such as oxygen depleted air can be used.

The absorption cycles in which the disclosed novel absorbent-working fluid pair are useful include all varieties known in the art, such as intermittent cycles as well as continuous cycles; cycles supplied sensible heat, latent heat, or any other type of heat including solar and hot combustion gas; simple cycles or compound/two stage cycles; forward or reverse cycles (U.S. Pat. Nos. 4,350,571 and 4,333,515 respectively), and cycles augmented by compressors, thermocompressors, and the like.

I claim:

1. In an absorption cycle apparatus of conventional and widely known type wherein the working fluid is water, the improvement comprising an absorbent comprised of an aqueous mixture of alkali metal nitrates which contains essentially no nitrite anion.

2. The apparatus according to claim 1 wherein the absorbent comprises a mixture of lithium nitrate, sodium nitrate, and potassium nitrate.

3. The apparatus according to claim 2 wherein the mixture comprises at least 20 molar percent each of lithium and potassium nitrates and at least 10 mole percent sodium nitrate, and wherein the absorbent is subjected to temperatures in excess of 200° C. in the absorption cycle.

4. A process for drying a hot gas by contacting the hot gas with an aqueous absorbent solution wherein the nonaqueous component consists essentially of at least two alkali metal cations and nitrate anions, and at most one of the components lithium cations and nitrite anions.

5. The process according to claim 4 wherein water comprises between 1 and 50 mole percent of the solution.

6. The process according to claim 5 wherein the anhydrous component consists of at least 10 ionic percent each of lithium, sodium, and potassium cations.

7. The process according to claim 5 wherein the anhydrous component contains nitrite anions.

8. The process according to claim 4 wherein the anhydrous component contains at least 10 ionic percent lithium cations.

9. The process according to claim 4 wherein the anhydrous component contains at least 10 ionic percent lithium cations.

10. A process comprising evaporating water to produce cooling, and absorbing the vapor into an aqueous absorbent in which the anhydrous component of the absorbent consists essentially of at least 20 mole percent $LiNO_3$, 20 mole percent $KNO_3$, and 10 mole percent $NaNO_3$.

11. The process according to claim 10 further comprised of exposing the absorbent to temperatures above 200° C.

* * * * *